United States Patent
Hosier et al.

(10) Patent No.: US 7,990,528 B2
(45) Date of Patent: Aug. 2, 2011

(54) HIGH RESOLUTION LINEAR IMAGE SENSING USING MULTI-ROW LOW RESOLUTION IMAGE SENSOR

(75) Inventors: Paul A. Hosier, Rochester, NY (US); Jagdish C. Tandon, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 28 days.

(21) Appl. No.: 12/569,596

(22) Filed: Sep. 29, 2009

(65) Prior Publication Data

US 2011/0075157 A1 Mar. 31, 2011

(51) Int. Cl.
*G01N 21/86* (2006.01)
*G03B 17/48* (2006.01)
*H01L 27/148* (2006.01)

(52) U.S. Cl. ........ 356/225; 356/222; 356/400; 356/638; 250/225; 358/474

(58) Field of Classification Search .................. 356/400, 356/638–640, 225; 250/222, 225, 216; 348/301
See application file for complete search history.

(56) References Cited

U.S. PATENT DOCUMENTS

| | | | |
|---|---|---|---|
| 4,172,664 A * | 10/1979 | Charsky et al. | 356/508 |
| 4,735,495 A | 4/1988 | Henkes | |
| 4,767,933 A * | 8/1988 | French et al. | 250/548 |
| 5,081,536 A | 1/1992 | Tandon et al. | |
| 5,221,976 A | 6/1993 | Dash et al. | |
| 5,543,838 A | 8/1996 | Hosier et al. | |
| 6,005,682 A * | 12/1999 | Wu et al. | 358/474 |
| 6,014,160 A | 1/2000 | Tewinkle et al. | |
| 6,157,019 A * | 12/2000 | Hosier | 250/208.1 |
| 6,373,042 B1 | 4/2002 | Kretschmann et al. | |
| 6,906,305 B2 * | 6/2005 | Pease et al. | 250/208.1 |
| 2002/0025164 A1* | 2/2002 | Suzuki | 396/429 |

* cited by examiner

*Primary Examiner* — Gregory J Toatley
*Assistant Examiner* — Rebecca C Slomski
(74) *Attorney, Agent, or Firm* — Simpson & Simpson, PLLC (57) ABSTRACT

A photosensitive chip, including: at least one set of photosensors substantially aligned in a Y direction; and a layer of non-transmissive material including a plurality of openings. Each opening in the plurality of openings includes a respective center line and overlaps only a portion of a respective photosensor so that only the portion of the respective photosensor is photosensitive. The respective center lines for openings for each set of photosensors are not collinear in the Y direction. In an example embodiment, the plurality of openings includes at least one row of openings substantially aligned in an X direction, orthogonal to the Y direction. In an example embodiment, each opening has an equal width in an X direction, orthogonal to the Y direction.

10 Claims, 7 Drawing Sheets

HIGH RESOLUTION LINEAR IMAGE SENSING USING MULTI-ROW LOW RESOLUTION IMAGE SENSOR

TECHNICAL FIELD

The present disclosure relates to use or modification of a multi-row lower resolution image sensor to provide higher resolution sensing.

BACKGROUND

Figure 6:
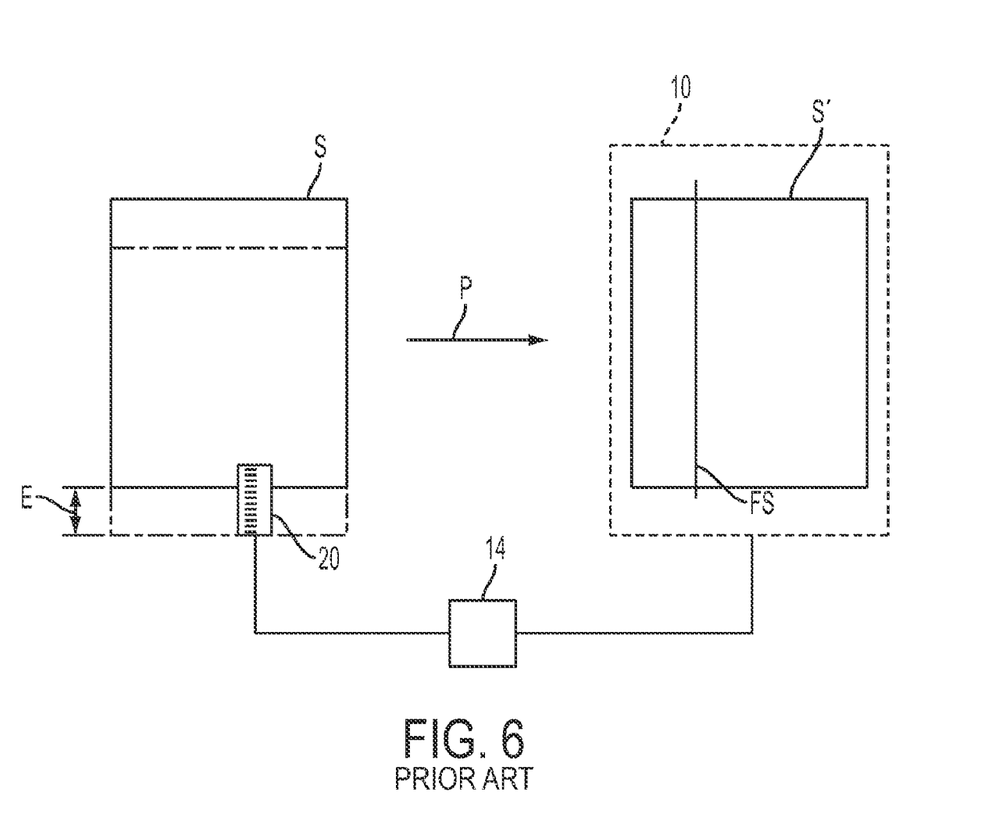
FIG. 6 is a diagram showing the basic principles of edge registration for sheets being fed into marking device, as known in the prior art; and, FIG. 7 is a sectional schematic view of a collimated light source, as known in the prior art.

FIG. 6 is a diagram showing the basic principles of edge registration for sheets being fed into a device, as known in the prior art. A sheet S is sent through a path in a process direction indicated as P toward a marking device generally indicated as 10. At a short interval before the sheet is fed through marking device 10 to receive an image thereon, the sheet is caused to pass over, in one particular embodiment, an optical sensor 20, which functions to detect an edge of the sheet.

Figure 5:
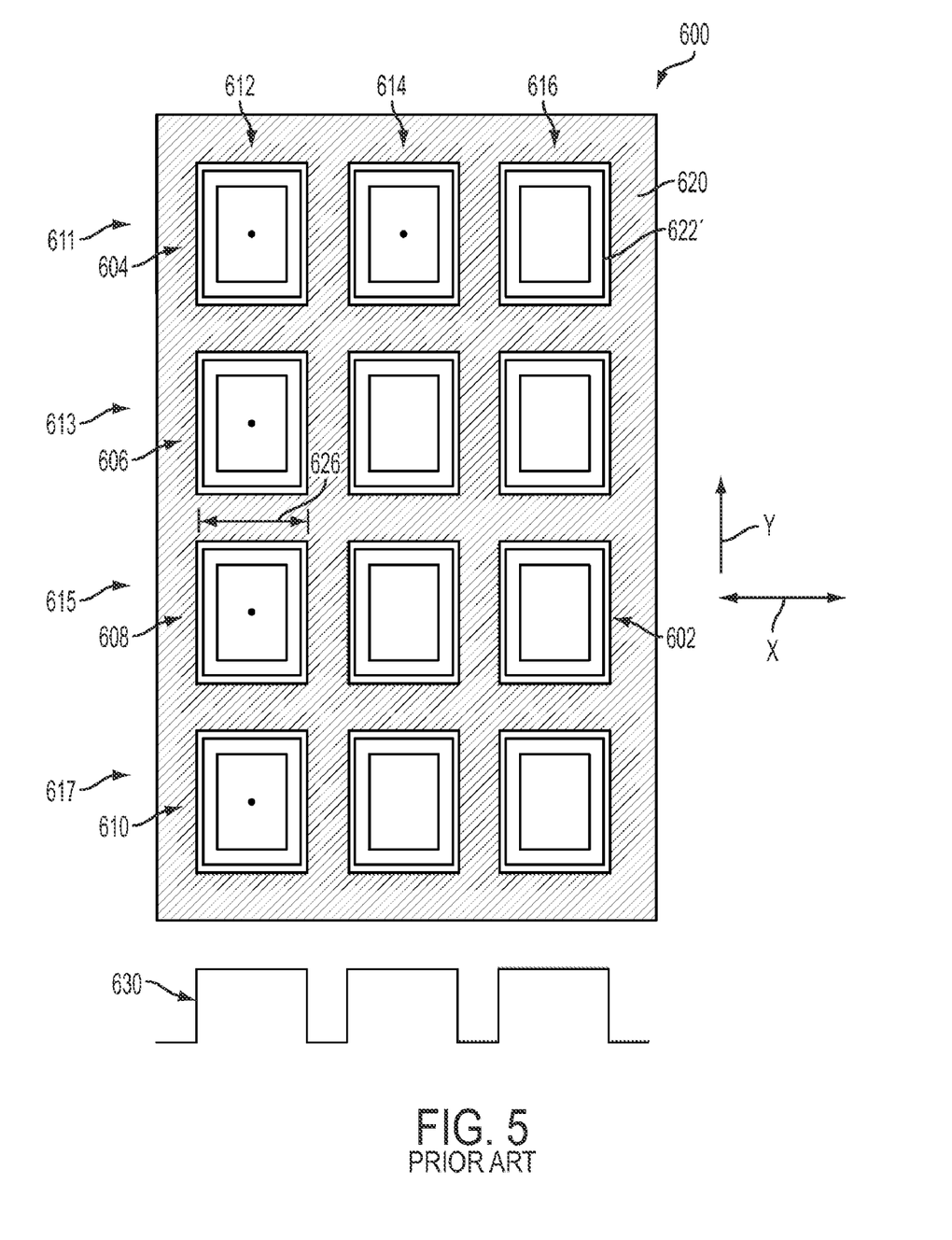
FIG. 5 is a plan view of a portion of a prior art multi-row linear sensor.

FIG. 5 is a plan view of a portion of prior art multi-row linear sensor 600, for example, as would be used in a digital copier. FIG. 5 shows a two-dimensional array of photosensors. An existing chip design, such as could include the portion shown for FIG. 5, has photosensors that are too large for precise detection of a sheet edge, for example, as discussed for FIG. 6. That is, the sensor configuration of FIG. 5 does not provide adequate resolution for edge detection operations.

SUMMARY

According to aspects illustrated herein, there is provided a photosensitive chip, including: at least one set of photosensors substantially aligned in a Y direction; and a layer of non-transmissive material including a plurality of openings. Each opening in the plurality of openings includes a respective center line and overlaps only a portion of a respective photosensor so that only the portion of the respective photosensor is photosensitive. The respective center lines for openings for each set of photosensors are not collinear in the Y direction According to aspects illustrated herein, there is provided a method for detecting an edge of a sheet of material, including: displacing a sheet of material past a photosensitive chip in a process direction. The photosensitive chip including: at least one set of photosensors substantially aligned in a Y direction; and an opening in a layer of non-transmissive material for each photosensor. Each opening forms a light gathering area for a respective photosensor. The method includes: displacing the chip so that the Y direction is aligned at an angle with respect to the process direction; receiving, in a processor for at least one specially programmed computer, respective electrical signals from the at least one set of photosensors; identifying, using the processor and the electrical signals, a location for the edge of the material with respect to a location for an opening for a photosensor from the at least one set of photosensors.

According to aspects illustrated herein, there is provided a method for detecting an edge of a sheet of material, including: displacing a sheet of material past a photosensitive chip in a process direction; receiving, in a processor for at least one specially programmed computer, respective electrical signals from the at least one set of photosensors; and identifying, using the processor and the electrical signals, a location for the edge of the material with respect to a location for an opening for a photosensor from the at least one set of photosensors. The photosensitive chip includes at least one set of photosensors substantially aligned in a Y direction; and a layer of non-transmissive material including a plurality of openings. Each opening in the plurality of openings includes a respective center line and overlaps only a portion of a respective photosensor so that only the portion of the respective photosensor is photosensitive. The respective center lines for openings for each set of photosensors are not collinear in the Y direction.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

FIG. 5 is a plan view of a portion of prior art multi-row linear sensor 600. Portion 600 includes n (greater than 1) rows of photosensors 602, for example, four rows, 604, 606, 608, and 610. The photosensors can be any photosensor known in the art. The sensor includes m (greater than 1) columns, or sets, of photosensors, for example, sets 612, 614, and 616. Portion 600 also includes layer 620 including a plurality of sets of pixel openings 622. The sets of openings correspond to sets of photosensors. For example, each pixel opening 622 encloses, or frames, a respective photosensor 602. Thus, each pixel opening 622 defines a light gathering area for a respective photosensor. Portion 600 also includes rows 611, 613, 615, and 617 of openings.

Figure 1:
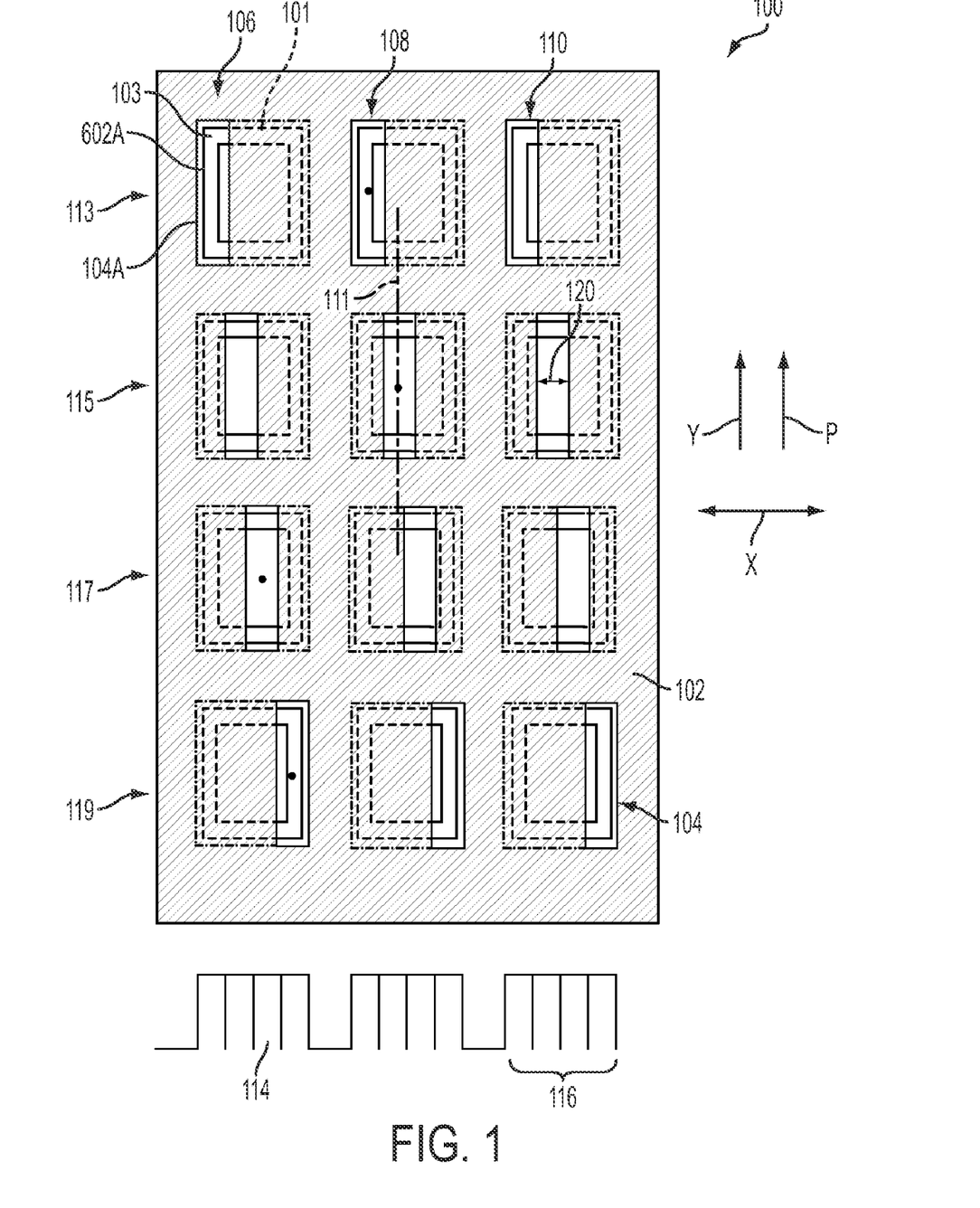
FIG. 1 is a plan view of a multi-row linear sensor with reduced pixel openings.

FIG. 1 is a plan view of multi-row linear sensor 100 with reduced pixel openings. Sensor 100 includes portion 600 (shown in FIG. 5) with modifications described infra. In an example embodiment, photosensors 602 are photo-diodes. Sensor 100 includes layer 102 of non-transmissive material. Layer 102 masks a portion of each photosensor so that only a portion of said each photosensor is photosensitive. Layer 102 also includes a plurality of pixel openings 104. Openings 104 are smaller and differently placed than openings 622. Each opening overlaps only a portion of a respective photosensor. For example, layer 102 masks portion 101 of photosensor 602A so that only portion 103 of photosensor 602A is photosensitive. Opening 104A overlaps only a portion of photosensor 602A, for example, portion 103.

Layer 102 can be any non-transmissive material or combination of non-transmissive materials known in the art. In an example embodiment, layer 102 is a metallic material used for masking purposes in the fabrication of integrated circuit chips. For example, the fabrication of portion 600 can be modified such that layer 620 is modified to form layer 102. In an example embodiment, layer 102 is made of a filter mask, for example, overlapping red and blue filter layers, placed over layer 620. Layer 102 includes a plurality of sets of openings 104. In an example embodiment, the number of sets of openings 104 equals the number sets of photosensors, for example, the sensor includes sets 106, 108, and 110 of openings 104. In an example embodiment, the number of openings in a set of openings is equal to the number of photosensors in a set of photosensors.

In an example embodiment, respective center lines 111, parallel to direction Y, for openings in each set of photosensors are not collinear in direction Y. In an example embodiment, respective openings in rows 113, 115, 117, and 119 of openings are aligned in direction X. In an example embodiment, width 120 for each opening is equal.

Sensor 100 can be used as an edge sensor for a device (not shown) handling a sheet or sheets of material, for example, paper. For example, sensor 100 could be an edge sensor for a digital scanner, copier, facsimile machine, or other document generating or reproducing device. The edge of the sheet of material is illuminated by a light source. In an example application, mainly collimated light is used to illuminate the edge of the sheet of material. In an example application, collimated light is used to illuminate the edge of the sheet of material.

Figure 7:
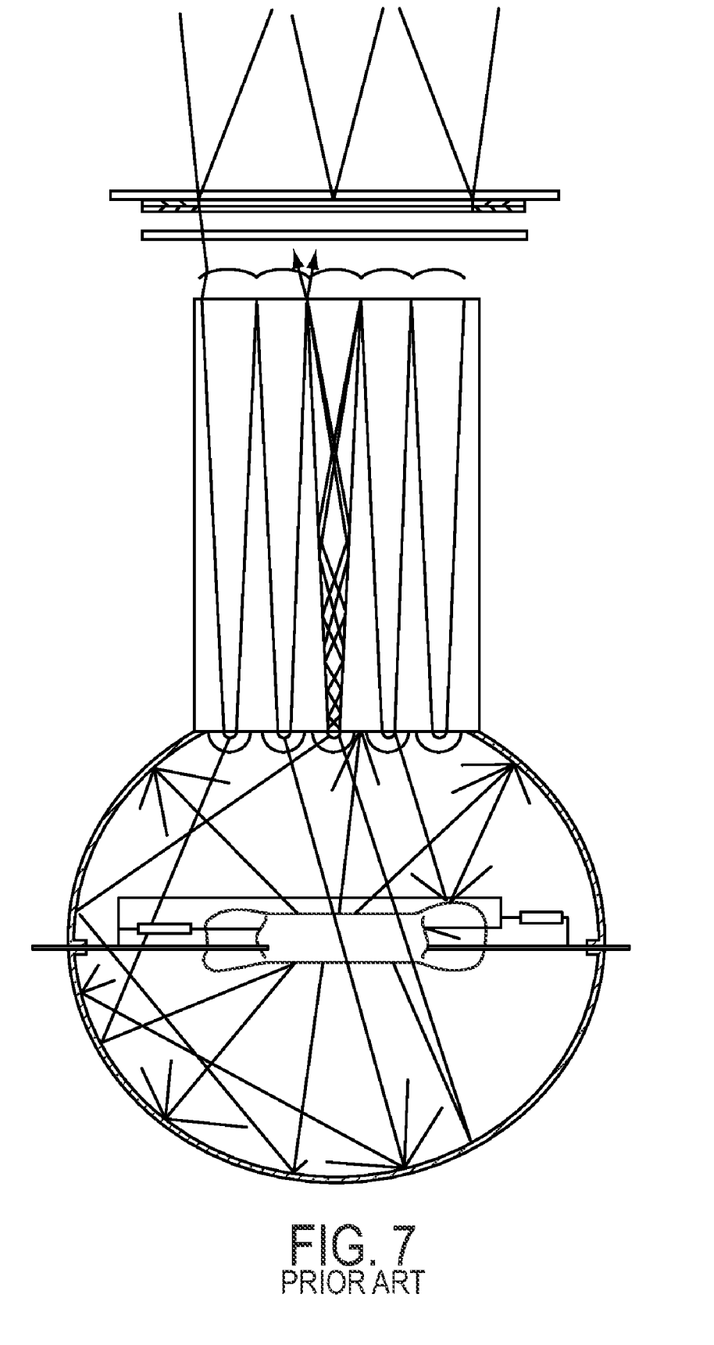

FIG. 7 is a sectional schematic view of a collimated light source, as known in the prior art. FIG. 7 illustrates a known prior art collimated light source, as described in U.S. Pat. No. 4,735,495.

Returning to FIG. 1, to illustrate the advantages of sensor 100 in the above applications, possible use of sensor 100 and portion 600 in the same applications is discussed. For example, assume portion 600 as described for FIG. 5 has a resolution of 600 SPI. Using data 630, a possible edge location within an opening for one of sets 612, 614, or 616 can be detected. Thus, if width 626 equals 32 microns, there is an uncertainty of 32 microns in direction X regarding the exact position of the edge within the opening.

In contrast, in an example embodiment, sensor 100 is used in an edge sensor, width 626 again equals 32 microns, and width 120 for an opening equals about 8 microns. Due to the arrangement of openings 104 in a column of openings 104 in sensor 100, a scan of a set of photosensors yields (n=4) pixel data 114 forming composite, or reconstituted, pixel data 116. Each data 114 can potentially yield data regarding an edge location. Therefore, data 116 can be used to increase the resolution possible for portion 600 substantially n-fold. In an example embodiment, simple threshold operations are used to determine an edge location from data 116, for example, for an edge location not collinear with a line 111. Thus, the uncertainty regarding the position of the edge of material in direction X is no more than the value for width 120. Therefore, in the above example, the resolution of sensor 100 is approximately four times greater than the resolution of portion 600. In an example embodiment, liner or higher order polynomial interpolation is used to determine the position of the edge of material Advantageously, pixel openings 104 have a larger light-gathering area than the prior art 2400 SPI sensors noted supra, with a corresponding advantageous increase in responsivity and signal to noise ratio.

Figure 2:
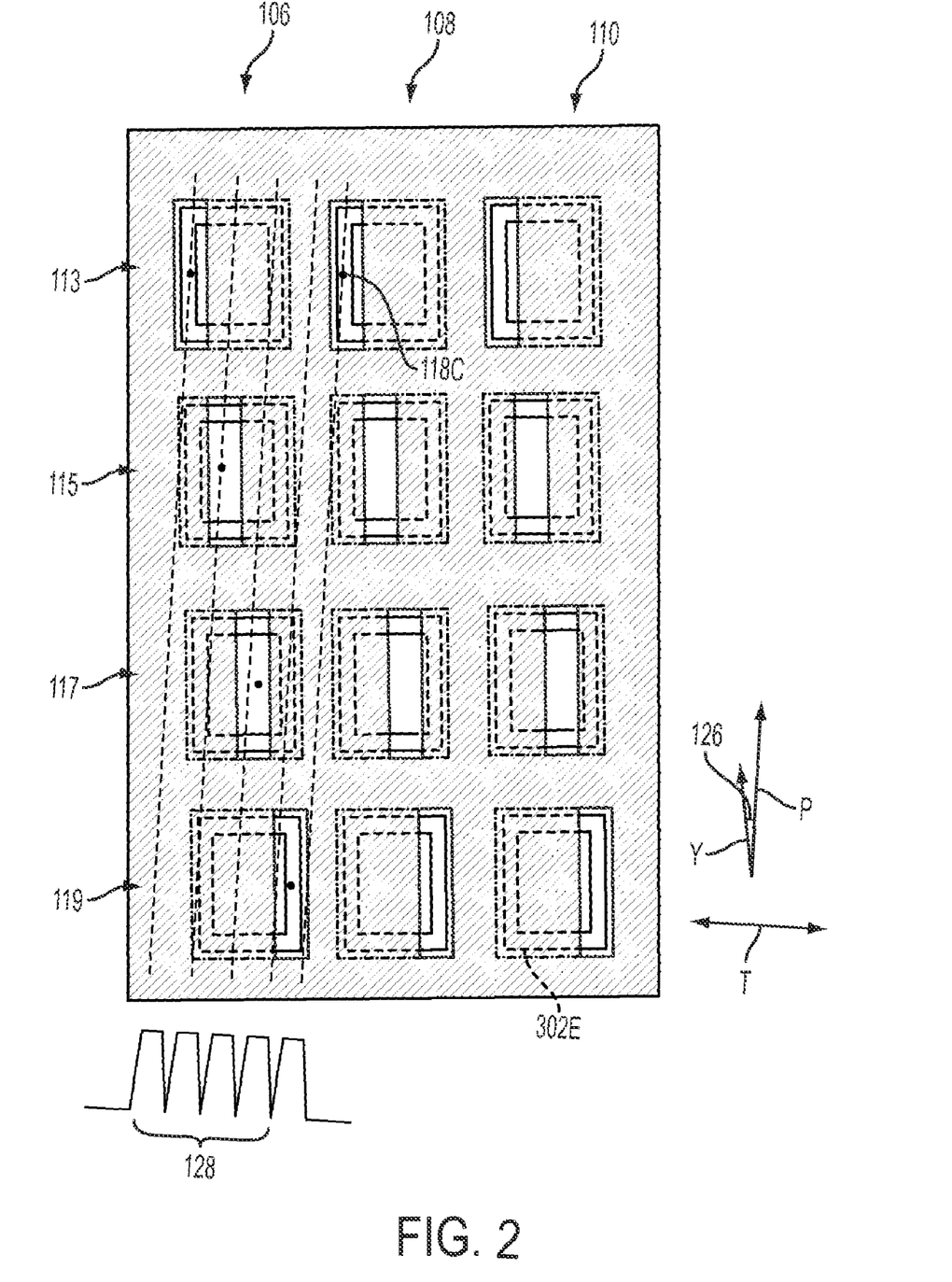
FIG. 2 is a plan view of the multi-row linear sensor shown in FIG. 1 in a tilted configuration.

FIG. 2 is a plan view of multi-row linear sensor 100 shown in FIG. 1 in a tilted configuration. In FIG. 2, sensor 100 is oriented, or tilted, at an angle 126 with respect to process direction P. For example, centers 118 for respective openings 104 for a set of photosensors are aligned at angle 126 with respect to direction P (direction Y is at angle 126 with respect to P). In an example embodiment as shown in FIG. 2, the angle is approximately 2.61 degrees and centers 118 are equally spaced in transverse direction T, orthogonal to process direction P. It should be understood that other angles are possible. The tilt of the sensor decreases a slope associated with data 128 and causes an overlap in direction P for adjacent photosensors and openings 104 in FIG. 2. Openings 104 and angle 126 can be selected to optimize the responsivity (signal strength), signal to noise ratio, and MTF for data 128 while ensuring that gaps are not present between adjacent openings 104 in direction P. The discussion for FIG. 1 regarding the use of a threshold operations and interpolation is applicable to FIG. 2.

Figure 3:
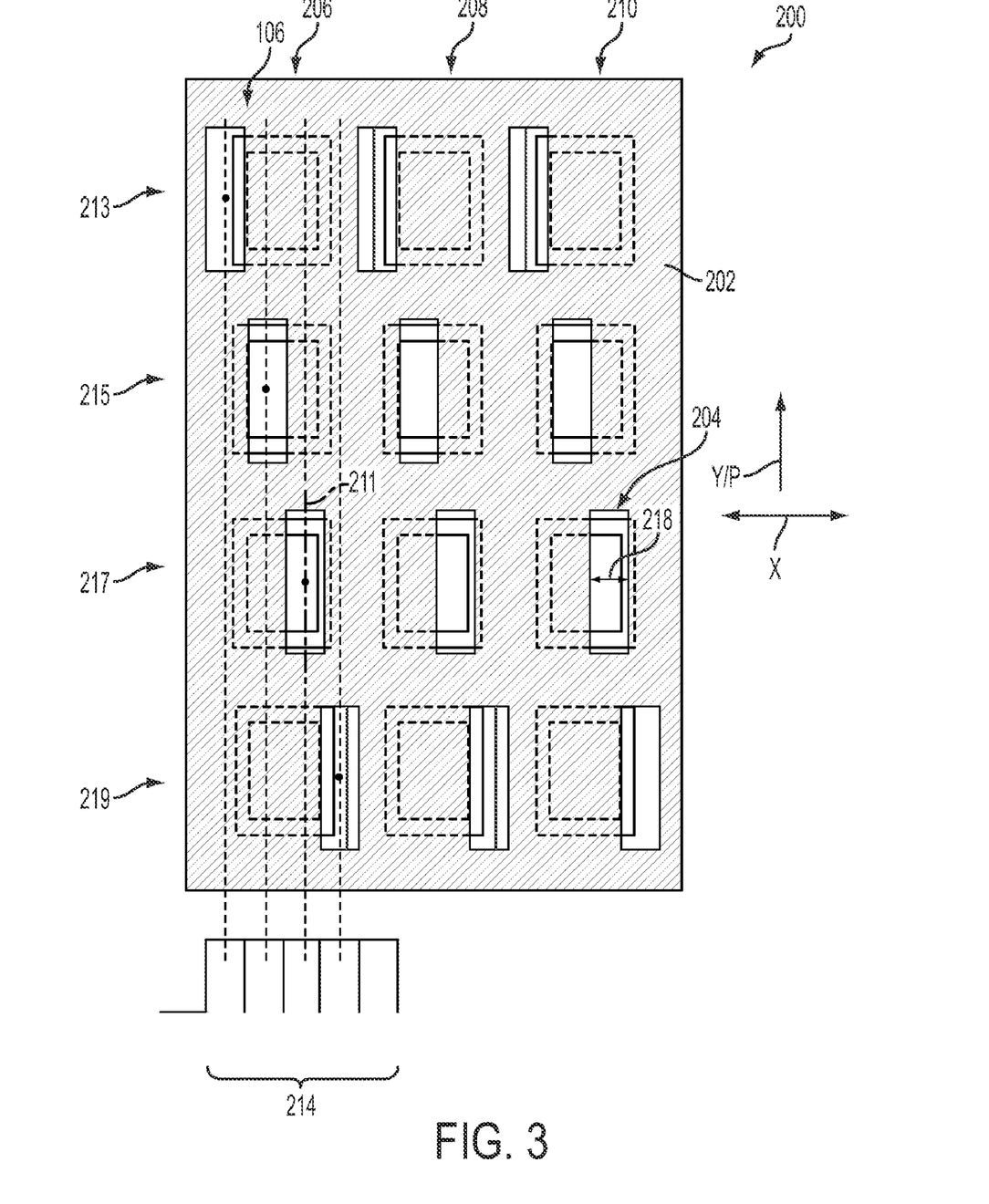
FIG. 3 is a plan view of a multi-row linear sensor with reduced pixel openings.

FIG. 3 is a plan view of multi-row linear sensor 200 with reduced pixel openings. Sensor 200 is similar to sensor 100 (shown in FIG. 1) with the exception of the size and placement of openings 204, which correspond to openings 104 in FIG. 1. Sensor 200 includes layer 202 of non-transmissive material including a plurality of sets of pixel openings 204, for example, sets 206, 208, and 210 and rows of openings, for example, rows 213, 215, 217, and 219. The discussion in the description of FIG. 1 for sets and rows of openings is applicable to the sets and rows of openings in sensor 200.

Sensor 200 can be used as an edge sensor for a device (not shown) handling a sheet or sheets of material, for example, paper and the discussion in the description of FIG. 1 regarding sensor 100 and an increase in resolution due to the size and positioning of openings 104 is applicable to sensor 200 and openings 204. For example, data 214 can be used to increase the resolution for sensor 600 substantially n-fold similar to the manner described supra for sensor 100.

Figure 4:
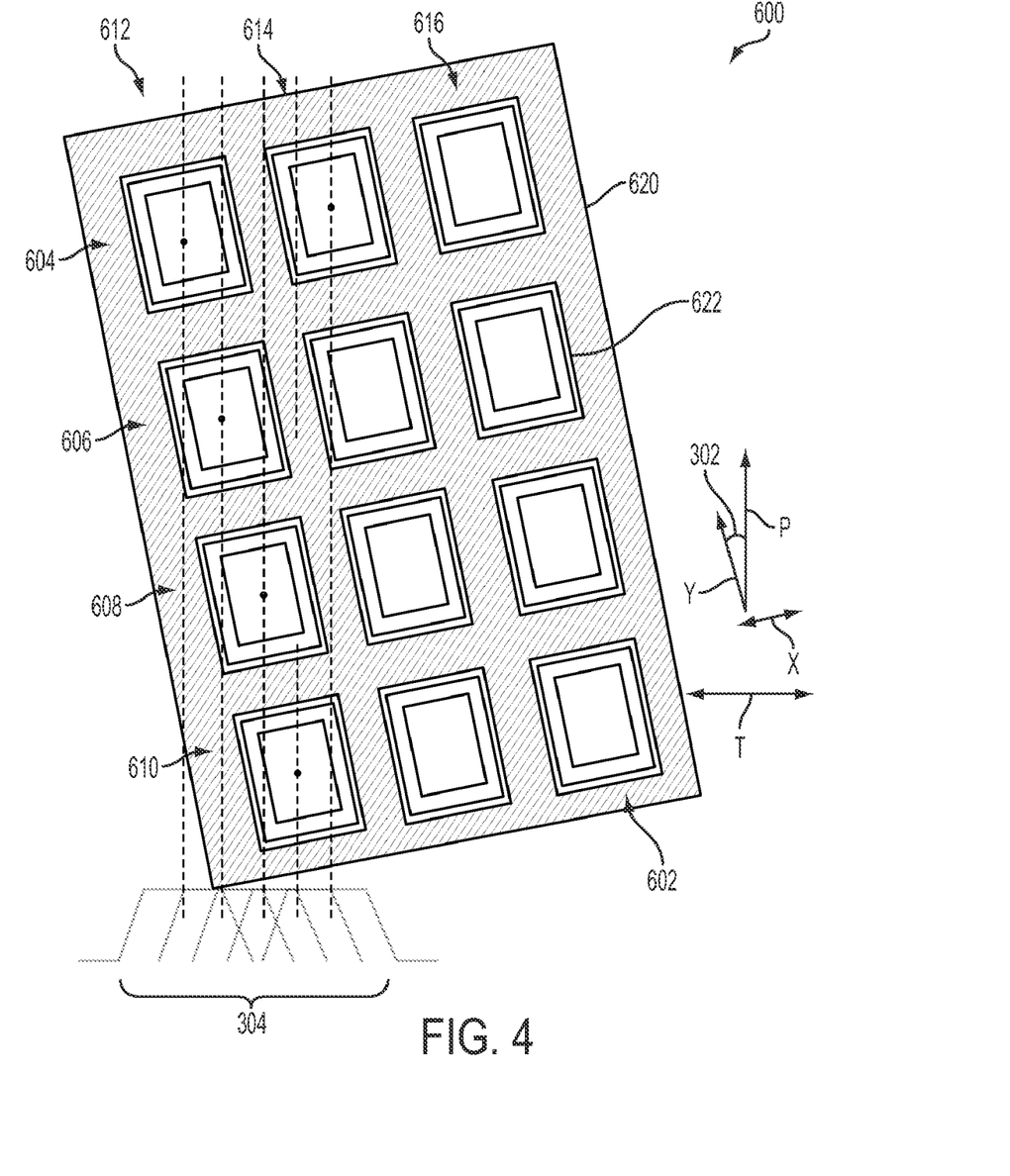
FIG. 4 is a plan view of a multi-row linear sensor in a tilted configuration.

FIG. 4 is a plan view of a multi-row linear sensor in a tilted configuration. FIG. 4 shows a portion of sensor 600, described in FIG. 5. In an example embodiment, photosensors 602 are photo-diodes. In an example embodiment, respective photosensors in each set of photosensors are aligned in direction Y. In an example embodiment, respective openings in each row of openings are aligned in direction X orthogonal to direction Y. In an example embodiment, widths 626 for the openings in the sensor are equal.

In FIG. 4, the portion of sensor 600 is disposed at an angle 302 with respect to process direction P. In an example embodiment, centers 636 are equally spaced in transverse direction T, orthogonal to process direction P. Angle 302 can be selected to optimize the responsivity (signal strength), signal to noise ratio, and modulation transfer function for data 304 to minimize blurring while eliminating pitch error. In an example embodiment, angle 302 equals approximately 10.59 degrees. It should be understood that other angles are possible. The discussion for FIG. 1 regarding the use of a threshold operations and interpolation is applicable to FIG. 4.

According to aspects illustrated herein development costs for a high resolution sensor, for example, a 2400 DPI sensor are reduced, since existing chips can be used as is, for example, tilted without modifying the chip as in FIG. 4, or with one simple wafer masking step, for example, as shown in FIGS. 1-3. Also, direct material costs are reduced since internal sensor design can be used instead of an externally supplied sensor.

According to aspects illustrated herein resolution is selectable and spatial MTF can be tuned to optimize effective processed resolution. Also, Moiré effects, for example, due to pitch error, can be removed with appropriate tilt and pixel opening size, for example, as shown in FIG. 2. Further, responsivity can be increased by modifying or using a lower resolution chip with a large height for pixel openings.

It will be appreciated that aspects described herein can be applied to any designed pixel opening with the appropriate chip tilt or position interpolation. For example, the aspects can be applied to any number of n-rows of photosensors, to increase the resolution n times, including on area sensor arrays. For example, for a 600 SPI chip with three rows of photosensors, aspects disclosed herein could be used to generate 600 SPI×3=1800 SPI resolution. Aspects disclosed herein also are applicable to chips having resolutions other than 600 SPI.

As noted supra, according to aspects illustrated herein, there is provided a method for detecting an edge of a sheet of material. In an example embodiment, a set of photosensors includes a first number of photosensors; when aligned in the process directions, the set of photosensors enables a resolution equal to a first value; and when the chip is displaced so that the Y direction is aligned at the angle with respect to the process direction, the set of photosensors enables a resolution equal to the first value multiplied by the first number. In an example embodiment, the method illuminates the sheet of material with mainly collimated light. In an example embodiment, the method illuminates the sheet of material with collimated light. In an example embodiment, the layer of non-transmissive material masks a portion of each respective photosensor so that only a portion of said each respective photosensor is photosensitive.

In an example embodiment, each opening in the plurality of openings overlaps only a portion of a respective photosensor; and respective center lines, parallel to the Y direction, for respective openings for each set of photosensors are not collinear in the Y direction. In an example embodiment, each opening in the plurality of openings overlaps only a portion of a respective photosensor; the plurality of openings includes at least one row of openings aligned in an X direction orthogonal to the Y direction; and each opening has an equal width in the X direction.

Although specific numbers, sizes, shapes, and configurations of photosensors and openings are shown in the drawings, it should be understood that other numbers, sizes, shapes, and configurations of photosensors and openings are applicable to aspects illustrated herein.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What we claim is:

1. A photosensitive chip, comprising:
   at least one set of photosensors substantially aligned in a Y direction; and,
   a layer of non-transmissive material including a plurality of openings, wherein each opening in the plurality of openings includes a respective center line and overlaps only a portion of a respective photosensor so that only the portion of the respective photosensor is photosensitive and wherein the respective center lines for openings for each set of photosensors are not collinear in the Y direction.

2. The photosensitive chip of claim 1 wherein the plurality of openings includes at least one row of openings substantially aligned in an X direction orthogonal to the Y direction.

3. The photosensitive chip of claim 1 wherein each opening has an equal width in an X direction orthogonal to the Y direction.

4. A method for detecting an edge of a sheet of material, comprising:
   displacing a sheet of material past a photosensitive chip in a process direction, wherein the photosensitive chip includes:
   at least one set of photosensors substantially aligned in a Y direction; and,
   a layer of non-transmissive material with a plurality of openings, each opening forming a light gathering area for a respective photosensor;
   displacing the chip so that the Y direction is aligned at an angle with respect to the process direction;
   receiving, in a processor for at least one specially programmed computer, respective electrical signals from the at least one set of photosensors; and,
   identifying, using the processor and the electrical signals, a location for the edge of the material with respect to a location for an opening for a photosensor from the at least one set of photosensors, wherein:
   the layer of non-transmissive material masks a portion of each respective photosensor so that only a portion of said each respective photosensor is photosensitive;
   each opening in the plurality of openings overlaps only a portion of a respective photosensor; and,
   respective center lines, parallel to the Y direction, for respective openings for each set of photosensors are not collinear in the Y direction.

5. The method of claim 4 wherein:
   a set of photosensors includes a first number of photosensors;
   when aligned in the process directions, the set of photosensors enables a resolution equal to a first value; and,
   when the chip is displaced so that the Y direction is aligned at the angle with respect to the process direction, the set of photosensors enables a resolution equal to the first value multiplied by the first number.

6. The method of claim 4 further comprising illuminating the sheet of material with mainly collimated light.

7. The method of claim 4 further comprising illuminating the sheet of material with collimated light.

8. The method of claim 4 wherein:
   each opening in the plurality of openings overlaps only a portion of a respective photosensor;
   the plurality of openings includes at least one row of openings aligned in an X direction orthogonal to the Y direction; and,
   each opening has an equal width in the X direction.

9. A method for detecting an edge of a sheet of material, comprising:
   displacing a sheet of material past a photosensitive chip in a process direction, wherein the photosensitive chip includes:
   at least one set of photosensors substantially aligned in a Y direction; and,
   a layer of non-transmissive material including a plurality of openings, wherein each opening in the plurality of openings includes a respective center line and overlaps only a portion of a respective photosensor so that only the portion of the respective photosensor is photosensitive and wherein the respective center lines for openings for each set of photosensors are not collinear in the Y direction;
   receiving, in a processor for at least one specially programmed computer, respective electrical signals from the at least one set of photosensors; and,
   identifying, using the processor and the electrical signals, a location for the edge of the material with respect to a location for an opening for a photosensor from the at least one set of photosensors.

10. The method of claim 9 wherein:

the layer of non-transmissive material includes a plurality of openings, each opening overlapping only a portion of a respective photosensor;

the plurality of openings includes at least one row of openings aligned in an X direction orthogonal to the Y direction; and, each opening has an equal width in the X direction.

* * * * *